(No Model.) 3 Sheets—Sheet 1.

C. O. BASTIAN & H. C. HODGES.
PREPAYMENT MECHANISM FOR ELECTRICAL OR OTHER METERS.

No. 584,258. Patented June 8, 1897.

Witnesses
D. H. Blakelock
John C. Wilson

Inventors
Charles Orrin Bastian
and Herbert Carl Hodges,
by Whitman & Wilkinson,
Attorneys.

(No Model.) 3 Sheets—Sheet 2.

C. O. BASTIAN & H. C. HODGES.
PREPAYMENT MECHANISM FOR ELECTRICAL OR OTHER METERS.

No. 584,258. Patented June 8, 1897.

Witnesses
D. H. Blakelock
John C. Wilson

Inventors
Charles Orme Bastian
and Hubert Cecil Hodges
by Whitman & Wilkinson
Attorneys.

(No Model.) 3 Sheets—Sheet 3.

C. O. BASTIAN & H. C. HODGES.
PREPAYMENT MECHANISM FOR ELECTRICAL OR OTHER METERS.

No. 584,258. Patented June 8, 1897.

Witnesses
D. H. Blakelock.
John C. Wilson

Inventors
Charles Orme Bastian
and Herbert Cecil Hodges
by Whitman & Wilkinson,
Attorneys.

THE NORRIS PETERS CO., PHOTO-LITHO., WASHINGTON, D. C.

UNITED STATES PATENT OFFICE.

CHARLES O. BASTIAN AND HERBERT CECIL HODGES, OF LONDON, ENGLAND.

PREPAYMENT MECHANISM FOR ELECTRICAL OR OTHER METERS.

SPECIFICATION forming part of Letters Patent No. 584,258, dated June 8, 1897.

Application filed August 17, 1896. Serial No. 603,057. (No model.)

*To all whom it may concern:*

Be it known that we, CHARLES ORME BASTIAN, electrical engineer, of 8ª Manchester Square, and HERBERT CECIL HODGES, manufacturer and electrical engineer, of 30 Hampstead Road, London, England, subjects of the Queen of Great Britain, have invented certain new and useful Improvements in Prepayment Mechanism for Electrical or other Meters, of which the following is a specification.

This invention relates primarily to prepayment electricity meters although applicable to other meters, particularly prepayment gas-meters, and has for its object to provide comparatively simple and inexpensive, but accurate and reliable, mechanism for the purposes of such prepayment-meters.

Figure 8:
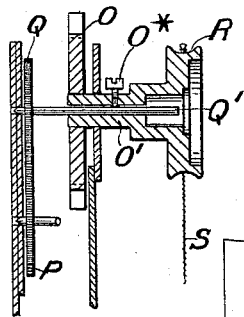
Figure 2:
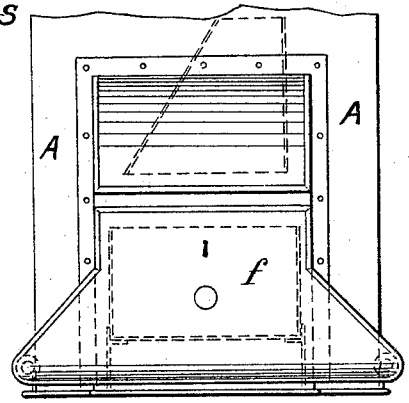
Figure 3:
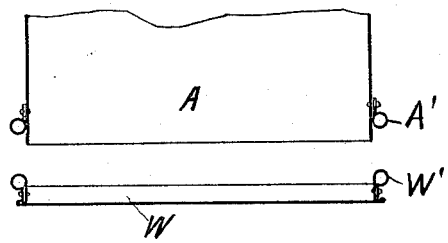
Figure 1:
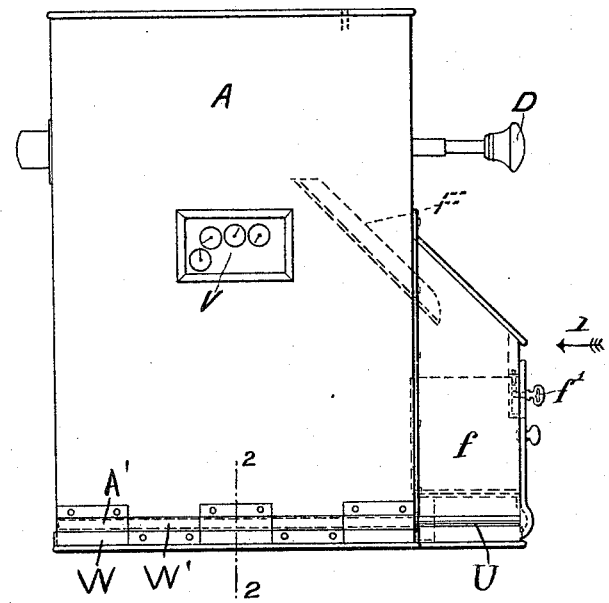
Figure 6:
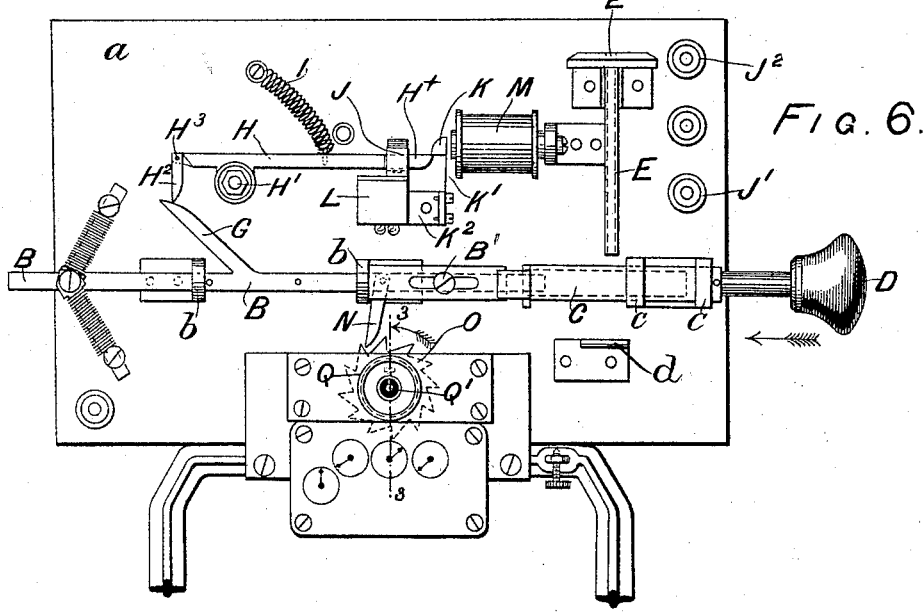
Figure 4:
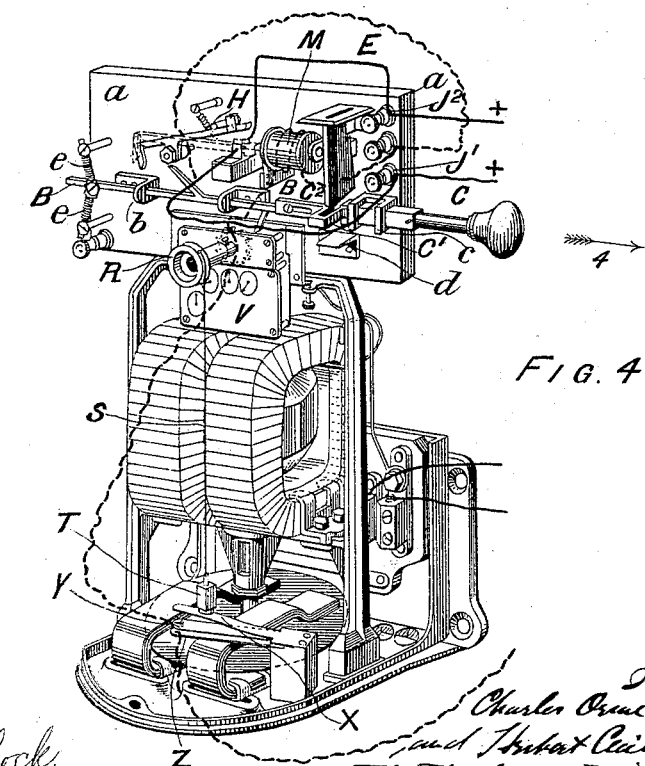
Figure 7:
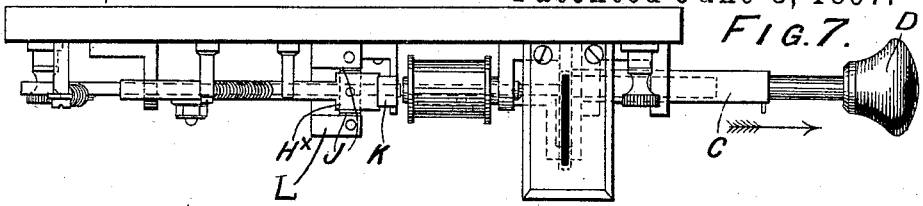
Figure 5:
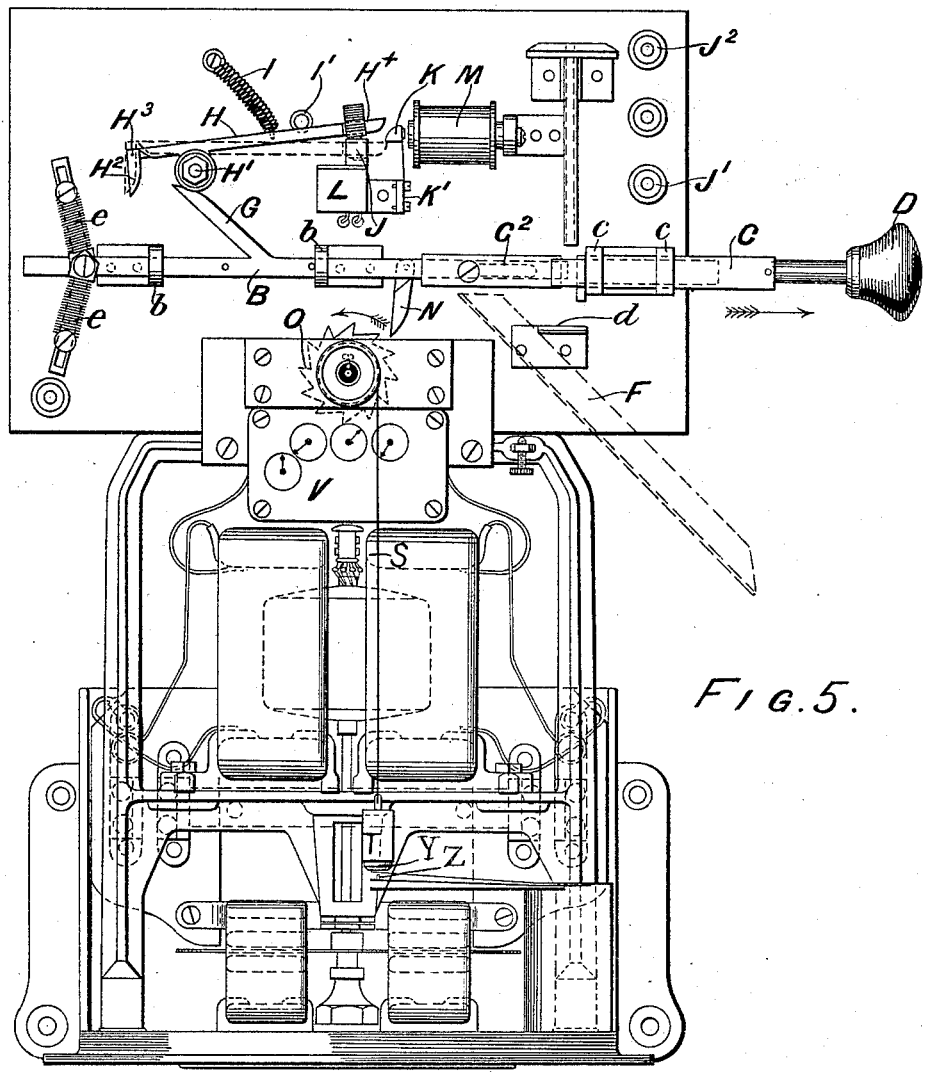

We will now proceed to describe our invention with reference to the accompanying drawings, which illustrate a prepayment electricity meter according to our said invention, as follows:

Figure 1 is a front view of the meter inclosed in a suitable case. Fig. 2 is a side view of the lower part of same, looking in the direction of the arrow 1, Fig. 1. Fig. 3 is a "local" sectional view on line 2 2, Fig. 1, showing the case or cover detached from the bottom or stand W on which the meter is fixed. Fig. 4 is a view in perspective of the meter and prepayment mechanism with the outer case or cover removed and on a rather larger scale than Fig. 1. Fig. 5 is a front elevation of Fig. 4, only on a larger scale than the latter, showing the handle or push-knob "out" ready to be pushed in on the insertion of a coin. Fig. 6 is a similar view of the upper part of Fig. 5, showing the handle or push-knob "in" and the circuit closed. Fig. 7 is a plan of Fig. 5. Fig. 8 is a local vertical section on line 3 3, Fig. 6.

Similar letters of reference indicate corresponding parts throughout.

In a suitable case or inclosure A any suitable means (such as are now well known in so-called "automatic" or "coin-freed" apparatus) may be arranged and mounted so that on the insertion of a coin or token of proper value, size, or denomination an operating bar or rod B (hereinafter referred to as the "operating-rod") may thereby be reciprocated or moved in such a manner as to operate as hereinafter described, but for the sake of example we will describe a simple push-piece C, projecting through the side of the case or inclosure A, with a knob, such as D, thereon, the inner end of which is hollow or tubular, so as to pass over the end of the operating-rod B like a piston and cylinder unless the proper coin or token is dropped in the slot E so as to come in between said hollow end C and said operating-rod B, whereupon said operating-rod can be pushed in one direction by said knob D, and the coin drops down, or any suitable device may be employed to remove the coin from between these said two parts, and upon the return movement of the push-piece C, either by pulling same out or by a spring, the same will pull back with it said operating-rod B, to which it is attached by a suitable chain or connection, or the latter may be independently returned also by a spring or its equivalent.

In the arrangement shown in the drawings the hollow push-piece C, (which is free to slide in the guides $c\ c$ on the main frame or mount $a$) has an extension thereon (see Fig. 4) in the form of a loop C', and then the slotted end C² extends parallel with the hollow part C and a stud or pin B', fixed on the operating-rod B, connects the latter to the push-piece C, but in such a manner that the one is free to slide upon the other, the said operating-rod being free to slide through the guides $b\ b$ for same, also fixed to said mount $a$.

On the insertion of a token or coin of the proper size or value in the slot E it falls down onto the coin support or rest $d$, fixed to the mount $a$, and is held in position there by the aforesaid loop C', so that it (the coin) is thus interposed between the hollow inner end of the push-piece C and the end of the operating-rod B, so that on pushing in the former thereby the latter is pushed along in the opposite direction to the arrow 4, Fig. 4, whereby the coin is pushed off the rest $d$.

Two springs $e\ e$ are each attached at one end to the mount $a$ and at the other end to the operating-bar B, as shown in Figs. 4 and 5, so that such last-named ends move along with said bar B, whereby when the latter is pushed in, as aforesaid, it first causes the compression of said springs $e\ e$ until they have passed the center, whereupon the expansion of said springs will force the bar B away from the push-piece C into the position shown in Fig. 6 and thus allow the coin to drop from between bar B and push-piece C down the chute F into any suitable receptacle, such as the drawer $f$, Figs. 1 and 2, locked by key $f''$ in the case A.

G is a fixed arm or rigid projection on the operating-rod B.

H is the contact-making device, pivoted at H' to the mount $a$ and having the depending arm $H^2$ pivoted or hinged thereto at $H^3$ in such wise that same can swing toward the knob D only. The end $H^\times$ of the device H forms the contact to close the main circuit.

I is a spring (one end fixed to the mount $a$ and the other to the device H) which normally tends to keep the end $H^\times$ out of contact.

J J are two points to which the main-circuit wire leads and between which the main circuit is broken when the end $H^\times$ is withdrawn out of contact therewith and through which the main circuit is completed when the end $H^\times$ is forced into contact therewith.

$J'$ $J^2$ are the corresponding main-circuit terminals, fixed to the mount $a$, one of the main-circuit wires being connected up to the terminal $J'$. Thence the main current passes through a suitable conductor to one of the points J and through the contact device $H^\times$ (when in position) to the other point J, and thence back to the terminal $J^2$.

I' is a stop (fixed on the mount $a$) to limit the movement imparted to the device H by the spring I.

K is a catch or clutch carried on the spring-arm K', which latter at its lower end is fixed rigidly to the support $K^2$ for same on the mount $a$.

L is a support fixed to the mount $a$ and carrying thereon the two said contacts J J, which latter are insulated from one another, as also from the spring arm and catch K K'.

M is an electromagnet, the wire or winding of which forms part of a local or shunt circuit (shown by the dotted lines in Fig. 4) from the main circuit, the terminals of this local circuit being on the spring-arms or contact-making devices Y and Z, respectively, which latter are normally held apart, so that this local circuit remains broken until the contacts Y and Z are pressed together to complete said local circuit, as hereinafter explained, whereupon a current is caused to flow round the electromagnet M, and thus the latter is magnetized, and consequently draws the catch or clutch K toward itself, and thereby draws said clutch K off or out of engagement with the aforesaid contact device H, which latter on being released is pulled back by its spring I, and thus breaks the main circuit and the local circuit, being arranged as shown in Fig. 4, (or in any other suitable manner,) so that the local circuit is also broken and, the current through the coil round the magnet M thus ceasing, consequently the magnet releases the spring-clutch K, which thereupon springs back into position ready to engage and hold the end $H^\times$ of the contact device H when same is forced down again, and so on.

Referring now again to the operating-bar B, N is a pawl or ratchet operating tooth hinge bound or pivoted or otherwise suitably arranged on said operating-bar B in such manner that while said pawl N is held rigid in one direction it is free to turn on its pivot in the other direction.

O is a ratchet or toothed wheel, the teeth on said wheel being of such a form and of such a number to suit the apparatus. For instance, these teeth may be deep cut, as shown, the distance between each tooth and the next (or it may be more than one tooth) being the measure of the amount of electricity to be supplied in exchange for each coin or token inserted.

P is the last of the train of wheels in an ordinary or any suitable counter or meter index, which latter is not shown in detail, the same being well known and in common use—as, for instance, of the type shown—viz., the well-known Thomson-Houston meter.

Q is an extra gear-wheel which is arranged in gear with the last wheel P (or other one) of the said train of wheels, so that this wheel Q is revolved when the wheel P is set in motion by the meter working. The spindle Q' of said wheel Q passes (see Fig. 8) through the ratchet-wheel O and through the sleeve O' on which said wheel O is fixed or formed, and an adjusting-screw or set-screw $O^\times$ is screwed up sufficiently tight to carry round said sleeve O' with said spindle Q', but at the same time will permit the former O' to be revolved (by the tooth or pawl N) upon said spindle Q', the latter, Q', being held by the gearing of the wheel Q with the wheel P aforesaid.

R is a drum fixed rigidly or formed on the sleeve O', so as to be revolved therewith.

S is a string, cord, or thread, one end of which is fixed to said drum R and the other end carries a suitable weight or device T.

W is the base or stand on which the case or cover A rests, and the latter is secured to the former by each being provided with bolt-holes or eyelets A' and W', which coincide, when in position, and through which a bolt or lock-pin U is passed, the latter being inclosed within the casing by the locked drawer $f$, or the case may be attached and locked or secured in any other suitable manner.

The operation is as follows: Before insertion of the first coin or token the weight or device T (suspended by the cord S) rests on the contact-piece Y, (which latter lies exactly perpendicularly below the periphery of the drum R,) so that the same, Y, touches the other terminal Z of the local circuit. On a coin or token being inserted in the slot E the operating-bar B can be moved, as explained, and the pawl N simultaneously imparts a partial rotation to the ratchet-wheel O, and consequently winds up the cord S on the drum R and thereby lifts the weight T a given distance above the contact Y, and at same time the main circuit is closed, as hereinbefore described, and thus as the current is used the meter is operated in the usual manner and the total amount consumed indicated on the dial V, as usual. Meantime the revolution of the train of wheels in the said meter causes the unwinding (very slowly) of the cord S, wound on the drum R, until, when nearly all the current paid for has been delivered, the weight T presses down the bell-contact device X, which, on touching Y, is arranged to close a local bell circuit (not shown) and thereby cause an electric bell to sound or give other signal as a warning that the current is about to cease. As soon as the weight T has pressed the contact Y onto the contact Z then the main circuit is broken, as before explained, and no current will flow until the insertion of another coin, and so on.

By causing the pivoted lever H to open or close a gas cock or valve in the gas-main (instead of making electrical contact as aforesaid) we could thus employ our present invention for prepayment gas-meters, a small battery being of course required to be added to provide the local circuit through the electromagnet M.

Having thus described our invention, what we claim as new, and desire to secure by Letters Patent of the United States, is—

1. In a coin-freed prepayment meter, the combination with a movable bar adapted to be operated by an exterior handle on the insertion of the proper coin or token, of means interposed in the path of travel of said bar or some projecting part thereon and adapted to be operated by the latter to permit the supply through the meter and means also interposed in the path of travel of the said bar or projecting part thereon to rotate in one direction an axis in connection with the meter-operated mechanism and rotated in the opposite direction by the movement of the latter and means carried on or operated by said axis to close a local electrical circuit when said axis has returned to its normal position and thereby cut off further flow through the meter until a fresh coin or token has been inserted substantially in the manner and for the purposes hereinbefore set forth.

2. In a prepayment meter, the combination with the meter mechanism of coin-freed mechanism adapted on the insertion of a coin to separate a contact-making device a given distance from another contact-making device in a local electrical circuit and simultaneously permit the supply through the meter, an axis operated by said meter mechanism and in connection with one of the said contact-making devices which is thereby moved into contact with the other said device whereby the said local circuit is completed and means operated by said local circuit to thereupon cut off further supply through the meter substantially as and for the purposes hereinbefore set forth.

3. In a prepayment electric meter, the combination with the meter mechanism having a main circuit and a local circuit therein; of a contact device in said main circuit; a contact device in said local circuit; devices adapted to be operated by the hand upon the insertion of a coin or token, to simultaneously close said main circuit and break said local circuit; devices operated by the working of the meter mechanism adapted to close said local circuit; and devices operated by said local circuit when closed to break said main circuit, substantially as described.

4. In a prepayment electric meter, the combination with the meter mechanism having a main circuit and a local circuit therein; of a contact device in said main circuit, normally held out of contact; an armature normally held in a position to engage said contact device to hold the same in a position to close said circuit; another contact device adapted to normally close said local circuit; devices, adapted to be operated by the hand upon the insertion of a coin or token, to simultaneously close said main circuit and break said local circuit; devices operated by the working of the meter mechanism adapted to move the contact device in said local circuit into contact; and a magnet in said local circuit adapted upon the closing of said circuit to disengage said armature from the contact device in the main circuit, and thus release said contact device and break said main circuit, substantially as described.

5. In a prepayment electric meter, the combination with the meter mechanism having a main circuit and a local circuit therein; of a contact device in said main circuit; a contact device in said local circuit; a drum, a cord wound on said drum, a weight suspended from said cord and adapted to break or close said local circuit by being lifted from or dropped upon said contact device in said local circuit; devices adapted to be operated by the hand upon the insertion of a coin or token to simultaneously close said main circuit through its contact device, and to wind up said cord on said pulley to raise said weight and thus break said local circuit; gearing between the said meter mechanism and said pulley adapted to unwind said cord and cause said weight to fall by the working of the meter, and thus to finally close said local circuit, and devices operated by said local circuit when closed, to throw the contact device in said main circuit out of contact, and thus break said main circuit, substantially as described.

6. In a prepayment electric meter, the combination with the meter mechanism having a main circuit and a local circuit therein; of a contact device in said main circuit normally held out of contact; an armature normally held in a position to engage said contact device and hold the same when moved into contact; another contact device in said local circuit; a drum, a cord wound on said drum; a weight suspended from said cord and adapted to break or close said local circuit by being lifted from or dropped upon said contact device in said local circuit; devices adapted to be operated by the hand upon the insertion of a coin or token to move the contact device in said main circuit into contact, and to wind up said cord on said drum to raise said weight and thus break said local circuit, simultaneously; gearing between the meter mechanism and said drum by means of which said cord is caused to unwind and said weight is caused to fall by the working of the meter mechanism, and thus to finally close said local circuit; and a magnet in said local circuit adapted upon the closing of said local circuit, to disengage said armature from the contact device in the main circuit, and thus release said contact device and break said main circuit, substantially as described.

CHAS. O. BASTIAN.
HERBERT CECIL HODGES.

Witnesses:
FRANCIS W. FRIGOUT,
FERDINAND J. HOLE.